US008357040B2

(12) United States Patent
Ansari et al.

(10) Patent No.: US 8,357,040 B2
(45) Date of Patent: Jan. 22, 2013

(54) TEMPLATED THREE-DIMENSIONAL WAGERING GAME FEATURES

(75) Inventors: Marwan Ansari, Plainfield, IL (US); Mark B. Gagner, West Chicago, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 1027 days.

(21) Appl. No.: 12/183,605

(22) Filed: Jul. 31, 2008
(Under 37 CFR 1.47)

(65) Prior Publication Data

US 2009/0036196 A1 Feb. 5, 2009

Related U.S. Application Data

(60) Provisional application No. 60/952,978, filed on Jul. 31, 2007.

(51) Int. Cl.
*A63F 13/02* (2006.01)

(52) U.S. Cl. .......................................................... 463/32

(58) Field of Classification Search .................... 463/16, 463/30, 31, 32, 40–42
See application file for complete search history.

(56) References Cited

U.S. PATENT DOCUMENTS

| | | | | |
|---|---|---|---|---|
| 6,139,433 | A * | 10/2000 | Miyamoto et al. | 463/32 |
| 6,525,731 | B1 * | 2/2003 | Suits et al. | 345/427 |
| 6,687,753 | B2 * | 2/2004 | Schneider | 709/235 |
| 2001/0044339 | A1 * | 11/2001 | Cordero et al. | 463/42 |
| 2002/0085046 | A1 * | 7/2002 | Furuta et al. | 345/848 |
| 2002/0111212 | A1 * | 8/2002 | Muir | 463/32 |
| 2002/0158905 | A1 * | 10/2002 | Bazzoni et al. | 345/760 |
| 2003/0032479 | A1 * | 2/2003 | LeMay et al. | 463/32 |
| 2003/0148811 | A1 * | 8/2003 | Sitrick | 463/31 |
| 2004/0189677 | A1 * | 9/2004 | Amann et al. | 345/660 |
| 2004/0239679 | A1 * | 12/2004 | Ito et al. | 345/555 |
| 2006/0119616 | A1 * | 6/2006 | Park | 345/619 |
| 2007/0010330 | A1 * | 1/2007 | Cooper et al. | 463/42 |

* cited by examiner

*Primary Examiner* — David L Lewis
*Assistant Examiner* — Matthew D. Hoel
(74) *Attorney, Agent, or Firm* — Schwegman Lundberg & Woessner, P.A.

(57) ABSTRACT

Systems and methods render three-dimensional objects for a wagering game component in accordance with graphical assets that may be downloaded. The graphical assets may include meshes, skins, physics characteristics, shader programs or other graphical assets.

19 Claims, 8 Drawing Sheets

TEMPLATED THREE-DIMENSIONAL WAGERING GAME FEATURES

RELATED APPLICATION

This application claims priority under 35 U.S.C. 119(e) from U.S. Provisional Application Ser. No. 60/952,978 filed Jul. 31, 2007, the content of which is incorporated herein by reference in its entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2007, WMS Gaming Inc. All Rights Reserved.

BACKGROUND

Wagering game machine makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience.

DETAILED DESCRIPTION

Figure 1:
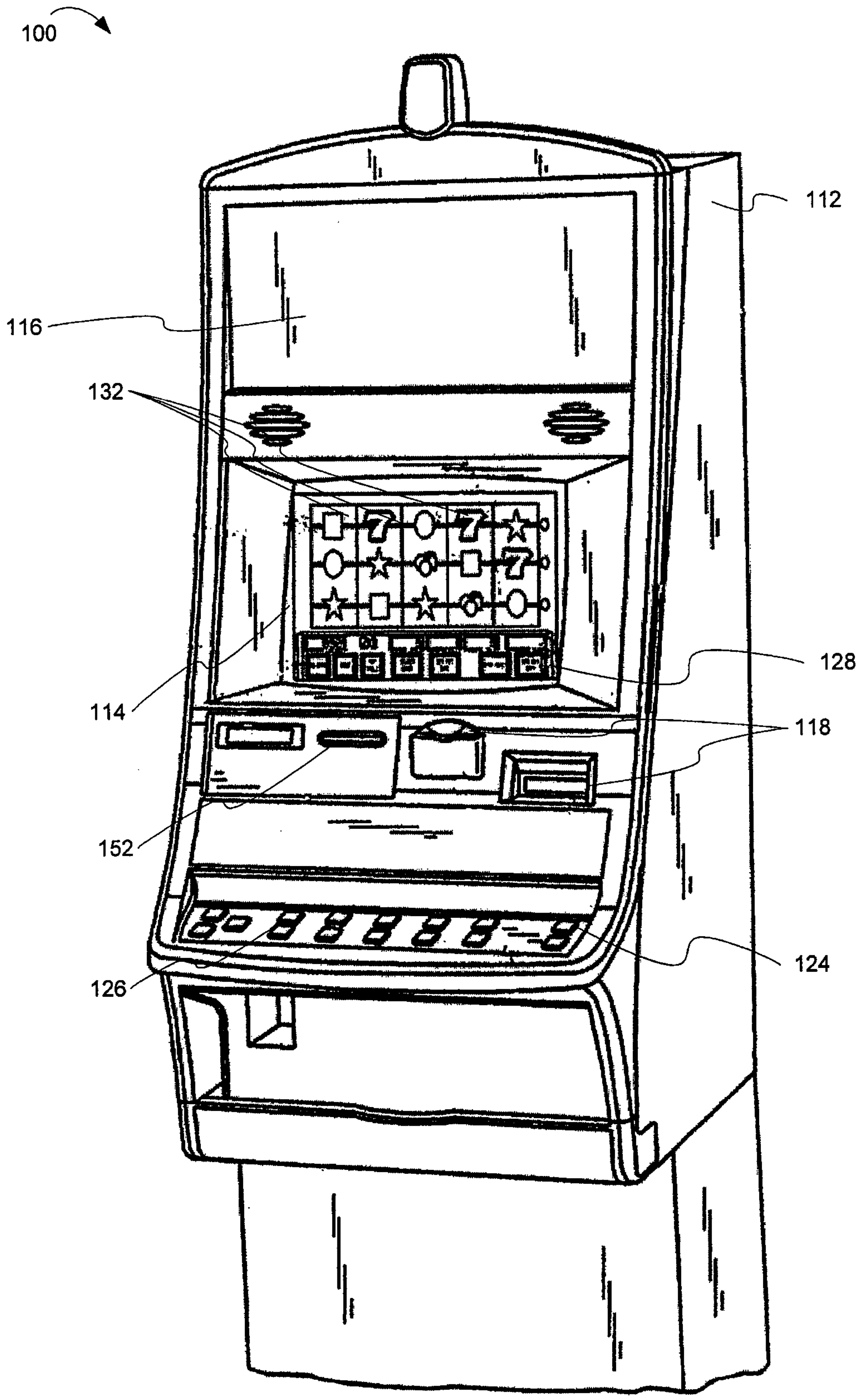
FIG. 1 is a perspective view of a wagering game machine, according to example embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

In general, the embodiments of the invention provide three-dimensional effects for various aspects of a wagering game presented on a wagering game machine.

Example Wagering Game Machine

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model. Further, in some embodiments, the wagering game machine 100 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Portable Wagering Game Machine

Figure 2:
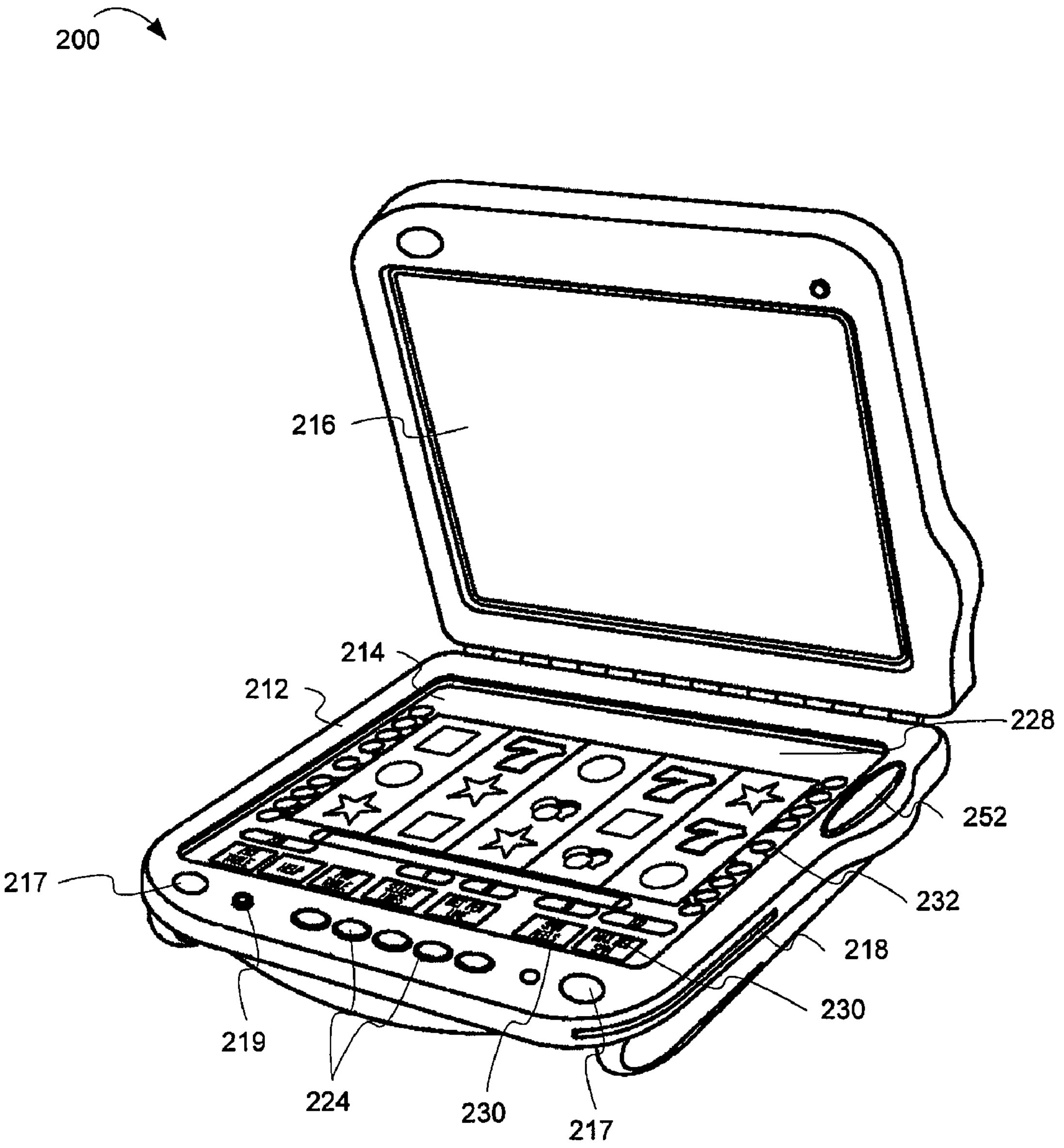
FIG. 2 is a perspective view of a portable wagering game machine according to an example embodiment.

FIG. 2 shows an example embodiment of a portable wagering game machine 200. The portable wagering game machine 200 can include any suitable electronic handheld or mobile device configured to play a video casino game such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, and may include a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 includes a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 210, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 210.

The player input device 224 may include a plurality of push buttons on a button panel for operating the wagering game machine 200. In addition, or alternatively, the player input device 224 can comprise a touch screen mounted to the primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 226 can provide inputs for one aspect of the operating the game, while the touch keys 230 can allow for input needed for another aspect of the game. The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display a bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

A player typically begins play of the basic wagering game on the wagering game machine 200 by making a wager (e.g., via the value input device 218 or an assignment of credits stored on the portable wagering game machine 200 via the touch screen keys 230, player input device 224, or buttons 226) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

In some embodiments, a portable wagering game machine 200 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Example Wagering Game Network

Figure 3:
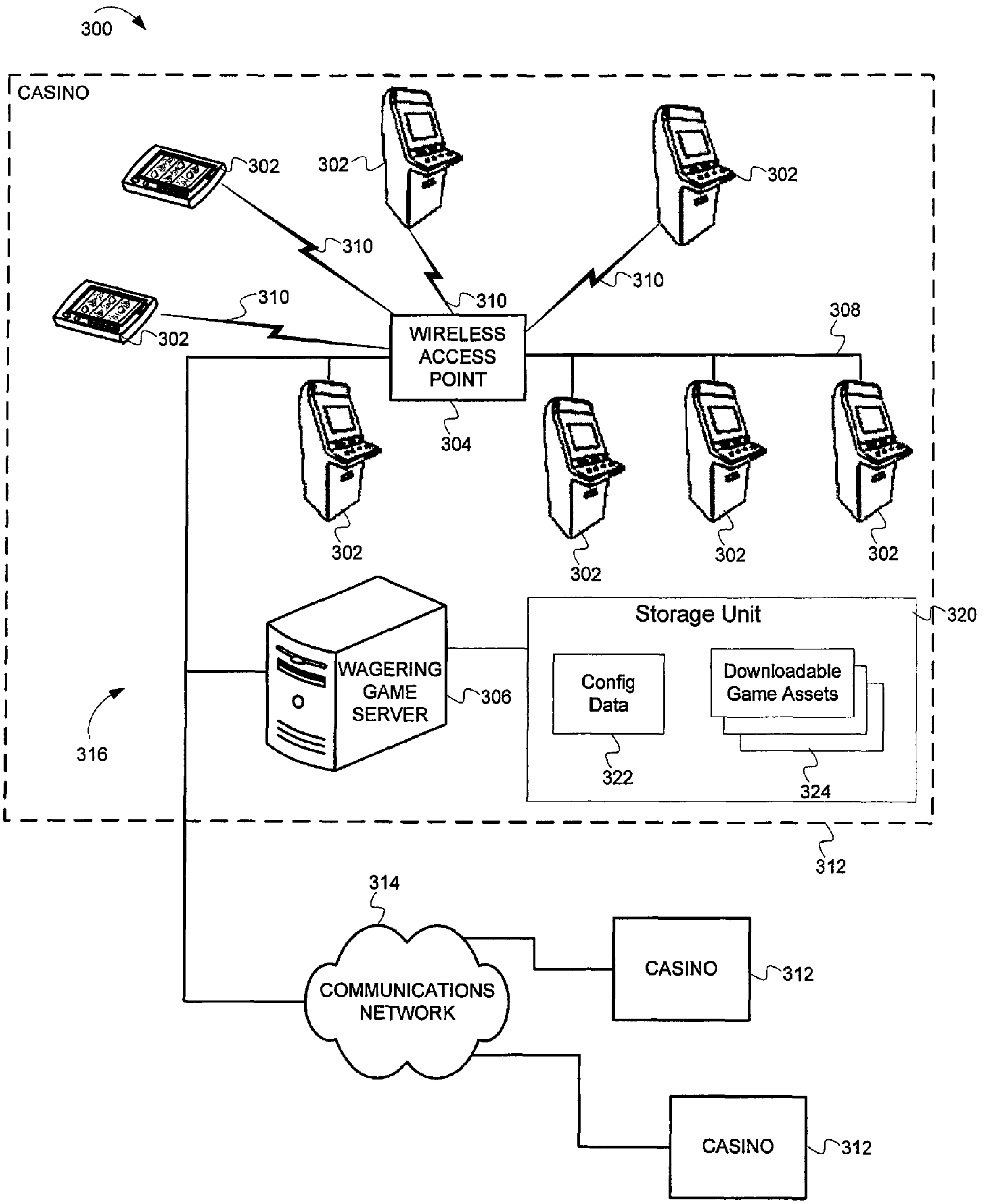
FIG. 3 is a block diagram illustrating a wagering game network, according to example embodiments of the invention.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models (see e.g. FIG. 1), handheld mobile units (see e.g. FIG. 2), bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

In some embodiments, a server such as wagering game server 306 may access storage 320, which may include configuration data 322 and graphical assets 324. Storage 320 may be one or more hard disks directly attached to server 306, or it may be storage accessible over a network such as on a separate file server or storage area network.

Storage 320 may be used in some embodiments to store configuration data 322 and/or graphical assets 324. In general, graphical assets 324 relate to the rendering and display of three-dimensional objects. Graphical assets 324 may include various combinations of one or more of the following:

- Mesh Data—Data defining a mesh of points, vertices or polygons (squares, triangles, circles, pyramids, cubes, cylinders, spheres etc.), where the mesh defines the surface and boundaries of a graphical object.
- Skeleton Data—Data defining a hierarchy of "bones" for a graphical object. Each bone may have a three dimensional transformation (which includes its position, scale and orientation), and an optional parent bone. The full transform of a bone is the product of its parent transform (if any) and its own transform. So for example, moving, rotating, or otherwise transforming a parent bone will also move, rotate or transform any child bones associated with the parent bone.
- Texture Data—Data that defines the appearance of the surface of an object. The data may be a texture map. A texture map is a pattern that is mapped onto the surface of a graphical object, for example, a surface defined using mesh data.
- Behavior Data—Data that defines how an object moves or flexes. For example, data that defines how an object may jump, run, walk, bend, bounce, deform etc. Behavior data may be used by a physics engine to determine how a graphical object moves or changes over time.
- Audio Cue Data—Data used to synchronize an audio stream with a video stream. Audio Cue Data may be used to define different speech patterns or to define when a sound occurs in a video stream.
- Shader Programs—Executable logic that determines how a graphical object is to be rendered.
- Object parameters—Data defining the size, location, orientation etc. of a graphical object.
- Lighting Models—Data defining the position, orientation, and intensities of light sources in a three-dimensionally rendered scene.

In some embodiments, configuration data 322 provides details on how specific graphical assets may be associated with graphical objects during the execution of a wagering game component.

The configuration data and the graphical assets may be maintained in storage 320 in a variety of ways. For example, the configuration data 322 and graphical assets 324 may be stored as files in a file system or as data in a database. Further details on the use of the above graphical assets 324 and configuration data 322 will be provided below.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 304 and the wagering game machines 302 can communicate in accordance with standards such as the Pan-European mobile system standard referred to as the Global System for Mobile Communications (GSM). In some embodiments, the wireless access point 304 and the wagering game machines 302 can also communicate in accordance with packet radio services such as the General Packet Radio Service (GPRS) packet data communication service. In some embodiments, the wireless access point 304 and the wagering game machines 302 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 304 and the wagering game machines 302 can provide packet data services (PDS) utilizing packet data protocols (PDP). In other embodiments, the wireless access point 304 and the wagering game machines 302 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 304 and the wagering game machines 302 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 304 and the wagering game machines 302 can communicate in accordance with an ultra-wideband (UWB) communication technique where a carrier frequency is not used. In other embodiments, the wireless access point 304 and the wagering game machines 302 can communicate in accordance with an analog communication technique. In other embodiments, the wireless access point 304 and the wagering game machines 302 can communicate in accordance with an optical communication technique, such as the Infrared Data Association (IrDA) standard. In some embodiments, the wireless access point 304 and the wagering game machines 302 can communicate in accordance with the Home-RF standard which can be in accordance with a Home-RF Working Group (HRFWG) standard.

Figure 4A:
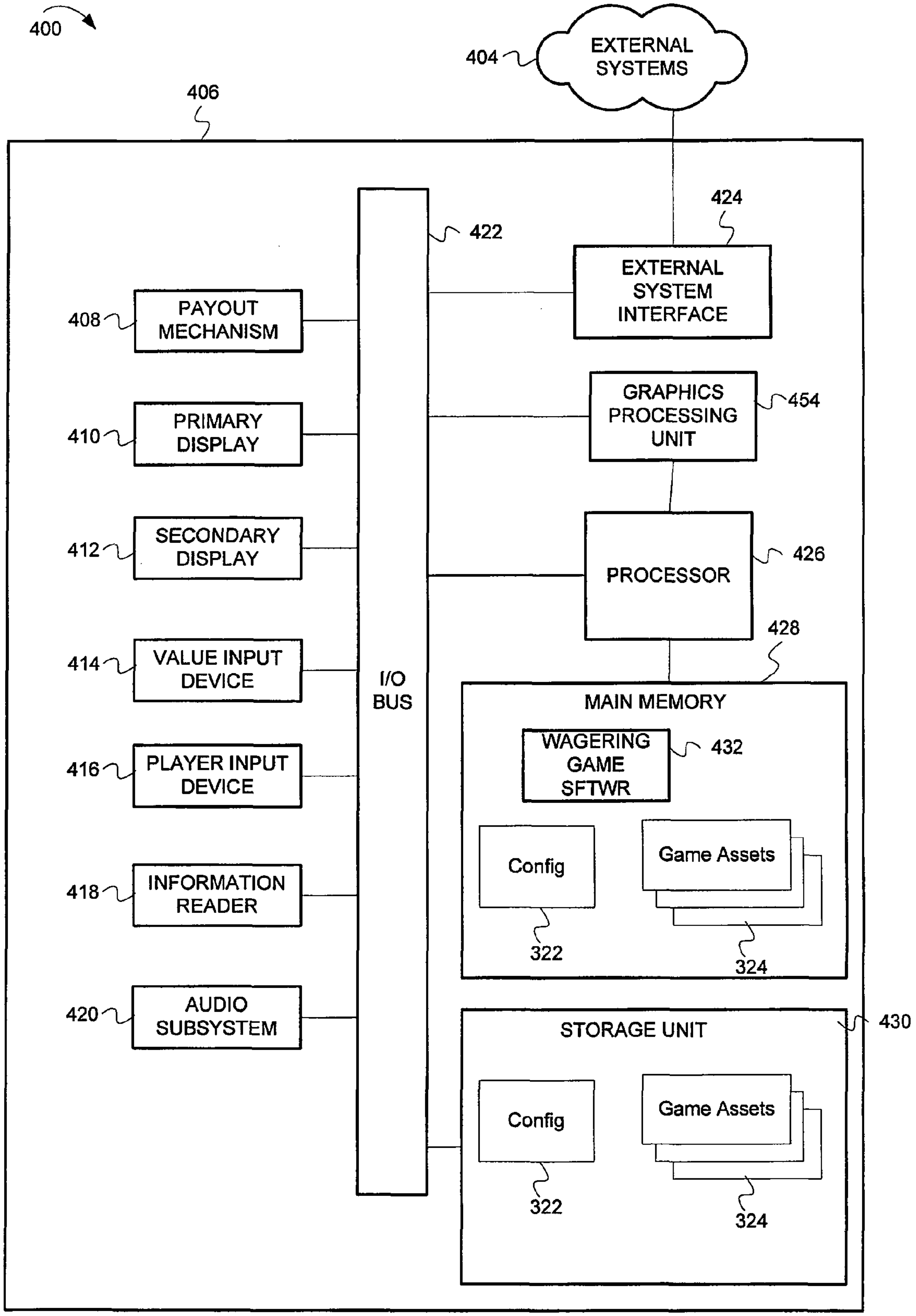
FIG. 4A is a block diagram of an architecture, including a control system, for a wagering game machine according to an example embodiment.

FIG. 4A is a block diagram illustrating a wagering game machine architecture 400, including a control system, according to example embodiments of the invention. As shown in FIG. 4A, the wagering game machine 406 includes a central processing unit (processor) 426 connected to main memory 428, which may store wagering game software 432. In one embodiment, the wagering game software can include software associated with presenting wagering games, such as video poker, video black jack, video slots, video lottery, etc., in whole or part. In addition, wagering game software 432 may include bonus rounds, themes, advertising content, attract mode content, pay tables, denomination tables, audio files, video files, operating system files and other software associated with a wagering game or the operation of a wagering game machine.

The processor 426 is also connected to an input/output (I/O) bus 422, which facilitates communication between the wagering game machine's components. The I/O bus 422 may be connected to a payout mechanism 408, primary display 410, secondary display 412, value input device 414, player input device 416, information reader 418, and/or storage unit 430. The player input device 416 can include the value input device 414 to the extent the player input device 416 is used to place wagers. The I/O bus 422 may also be connected to an external system interface 424, which is connected to external systems 404 (e.g., wagering game networks).

In general, graphics processing unit 454 processes three-dimensional graphics data and may be included as part of primary display 410 and/or secondary display 412. Graphics processing unit 454 includes components that may be used to provide a real-time three-dimensional rendering of a three-dimensional space based on input data. Various graphics engines are known in the art and may be used in various embodiments of the invention. In some embodiments, the graphics engine comprises a RenderWare graphics engine, available from Criterion Software. Graphics processing unit 454 may be implemented in software, hardware, or a combination of software and hardware.

In some embodiments, graphics processing unit 454 provides a set of one or more components that provide real-time three dimensional computer graphics for a wagering game application or other software running on a wagering game machine. Graphics processing unit 454 may also be referred to as a game engine. In some embodiments, graphics processing unit 454 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics processing unit 454 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 400 for a wagering game machine, graphics processing unit 454 or portions thereof may reside on systems external to the wagering game machine, such as on a game server.

In some embodiments, the components of graphics processing unit 454 may be replaced or extended with more specialized components. For example, in particular embodiments, graphics processing unit 454 may be provided as a series of loosely connected components that can be selectively combined to create a custom graphics engine for a wagering game application.

As noted above, various components may be present in a graphics processing unit 454. Some graphics engines provide real-time 3D rendering capabilities while other components outside of the graphics engine provide other functionality used by wagering games. These types of graphics engines 440 may be referred to as a "rendering engine," or "3D engine".

In some embodiments, the graphics processing unit 454 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Wagering game software 432 may be loaded from storage unit 430, or it may be loaded from external systems 404 such as servers of other systems on a wagering game network (illustrated further in FIG. 3). In general, wagering game software 432 comprises modules or units that operate to present one or more wagering game upon which monetary value may be wagered. During the course of presenting the wagering games, images composed of graphical objects are displayed on primary display 410 and/or secondary display 412. The graphical objects may represent various wagering game elements such as reels, cards, dice, symbols, animations, etc., and may also represent elements of a bonus round or other ancillary wagering game software component.

Storage unit 430 and/or main memory 428 may store configuration data 322 and game assets 324, described above in reference to FIG. 3. In some embodiments, the configuration data 322 and game assets 324 may be downloaded from a server 306 through external system interface 424 to storage unit 430 and/or main memory 428. In alternative embodiments, configuration data 322 and game assets 324 may be loaded directly onto a storage unit 430 for a wagering game machine 406 from other sources, including loading from a DVD-ROM, CD-ROM, flash memory, hard drive or other source. Once loaded, wagering game software 432, including various components of wagering game software 432 such as bonus rounds or episodes may make use of the graphical assets.

Some embodiments of the invention include an audio subsystem 420. Audio subsystem 420 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 406 can include additional peripheral devices and/or more than one of each component shown in FIG. 4A. For example, the peripherals may include a bill validator, a printer, a coin hopper, a button panel, or any of the many peripherals now found in wagering game machines or developed in the future. Further, in some embodiments, the wagering game machine 406 can include multiple external system interfaces 424 and multiple processors 426. In one embodiment, any of the components can be integrated or subdivided. Additionally, in one embodiment, the components of the wagering game machine 406 can be interconnected according to any suitable interconnection architecture (e.g., directly connected, hypercube, etc.).

In one embodiment, any of the components of the wagering game machine architecture 400 (e.g., the wagering game presentation unit 432 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 414 or devices coupled through player input device 416, the player may select any variables associated with the wagering game and place his/her wager to purchase a play of the game. In a play of the game, the processor 426 generates at least one random event using a random number generator (RNG) and provides an award to the player for a winning outcome of the random event. Alternatively, the random event may be generated by a remote computer using an RNG or pooling schema and then transmitted to the wagering game machine. The processor 426 operates the display 114 to represent the random event(s) and outcome(s) in a visual form that can be understood by the player. In some embodiments, a wagering game segment may be triggered based on certain events. For example, a bonus round may be triggered.

Figure 4B:
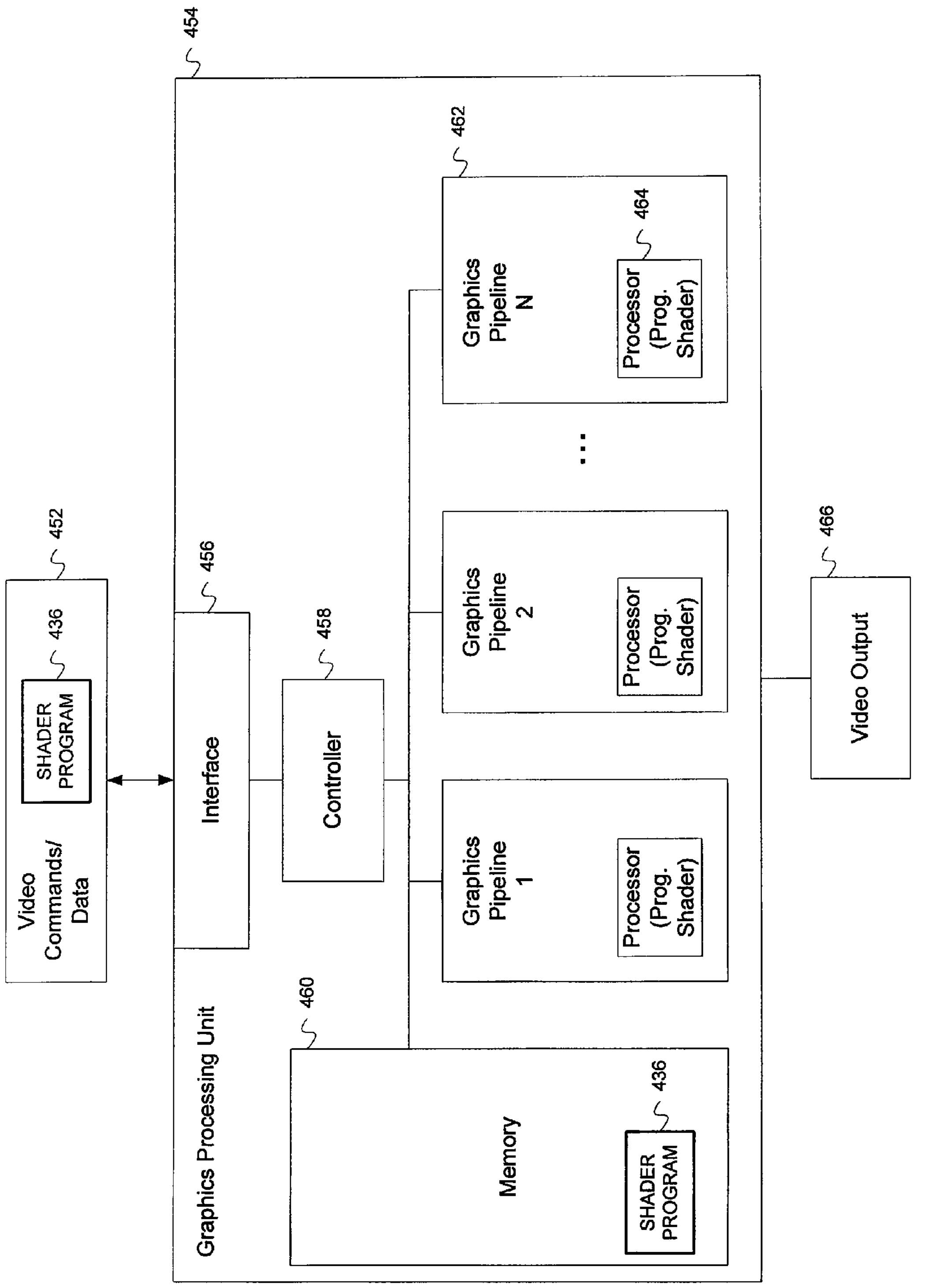
FIG. 4B is a block diagram of a graphics processing unit according to example embodiments of the invention.

FIG. 4B is a block diagram illustrating further details of a graphics processing unit 454 according to example embodiments of the invention.

Graphics processing unit 454 receives video commands and data 452 from processor 426 and produces video output 466 for presentation on a display coupled to the graphics processing unit 454. In some embodiments, graphics processing unit 454 includes an interface 456, a controller 458, memory 460 and implements one or more graphics pipelines 462. While the embodiments of the invention are not limited to any particular graphics processing unit 454, some embodiments use a graphics processing unit from the ATI RADEON® family of graphics processing units available from ATI Technologies Inc. of Markham, Ontario Canada. In alternative embodiments, a graphics processing unit from the NVIDIA family of graphics processing units available from NVIDIA Corporation of Santa Clara, Calif.

Interface 456 provides an interface between processor 426 and graphics processing unit 454. Interface 456 may be an I/O (input/output) interface or a bridge device to interface directly to processor 426. Examples of interface 456 include the Intel Northbridge and the Intel Southbridge type interfaces.

Commands/Data 452 received at interface 456 may be processed by controller 458. Controller 458 may be a processor used to coordinate and manage processing of video data by the graphics processing unit 454. For example, controller 458 may control the placement of commands and data into memory 460, and may manage commands and data passed to the one or more graphics pipelines 462.

As noted above, graphics processing unit 454 may include one or more graphics pipelines 462. In some embodiments, graphics processing unit may include 48 graphics pipelines 462. The inclusion of multiple graphics pipelines 462 on a graphics processing unit 454 enables graphics commands and data to be processed in parallel.

The graphics pipelines 462 may each include a processor 464. In some embodiments, the processor 464 may be referred to as a programmable shader. It should be noted that other processors may also be included as part of graphics pipeline 462. For example, a geometry processor and/or a rasterizer may also be included in a pipeline 462. Other processors or computation units may be included and may perform a variety of specialized functions that can include table lookups, scalar and vector addition, multiplication, division, coordinate-system mapping, calculation of vector normals, tessellation, calculation of derivatives, interpolation, and the like.

Programmable shader 464 may execute a shader program 436 loaded into memory 460 at run-time by controller 458. The shader program may be received from processor 426 through interface 452. In some embodiments, shader program 436 may be specified in a shader programming language that is proprietary to the graphics processing unit manufacturer. In alternative embodiments, a set or subset of "standardized" graphics operations commands and/or data may be supported. Examples of such standardized operations include various versions of DirectX or OpenGL languages.

The commands and/or data comprising shader program 436 for execution by programmable shader 464 in general include commands and/or data that control various aspects that affect the rendering of final surface properties of graphical objects to be presented on a display of a wagering game machine. For example, shader program 436 may include operations that include the calculation of one or more of: texture mapping, bump mapping, light mapping (light absorption, diffusion, reflection, refraction, shadowing), specular mapping, surface displacement, and other post-processing effects. Various parameters controlling the shading may be passed as parameters to the shader program. For example, the number of lights and lighting parameters (intensity, color etc.) may be passed as parameters to the shader program.

Various embodiments may implement one or various types of programmable shaders depending on the capabilities and requirements of a particular graphical processing unit 454. In general, the various types of programmable shaders include vertex shaders, geometry shaders, and pixel shaders. Multiple types of programmable shaders may exist on a graphics processing unit at the same time.

In general, vertex shaders operate on each vertex in a model containing three-dimensional graphical objects. Vertex shaders define a method to compute vector space transformations and other computations. In some embodiments, vertex type of programmable shader operates on basic data types, so graphical objects composed of complex structures are broken down before being passed to the vertex shader. The vertex shader receives the vertex positions of the graphical object in addition to parameters controlling the shading and positioning of the vertices defining the graphical object or objects. Functions that may be applied to the data include mesh deformation, vertex displacements, and texture coordinate transformations.

In general, pixel shaders may be used to compute pixel properties such as pixel color. Pixel shaders are typically applied for each pixel in a graphical object being processed in the pipeline. As with vertex shaders, various parameters may be supplied to the shader program to control lighting and texture computations applied to the set of pixels through the operation of the shader. For example, the parameters may specify the number, positions, intensities, and colors of one or more lights illuminating the graphical objects in a three-dimensional model.

In general, geometry shaders operate on vertices that may be grouped into primitives such as triangles, lines, strips and points. The vertices may comprise output from a vertex shader. Additionally, geometry shaders may make copies of input primitives, and as a result create new sets of vertices.

As discussed above, various parameters may be supplied to control lighting and shading. In some embodiments, the shaders may implement various types of shading models, including Gouraud shading, Phong shading and/or bump mapping.

In some embodiments, processor 426, graphics processor 454 and/or shader programs 436 may be used alone or in various combinations to produce various three-dimensional transformations and functions for various aspects of a wagering game display.

Figure 5:
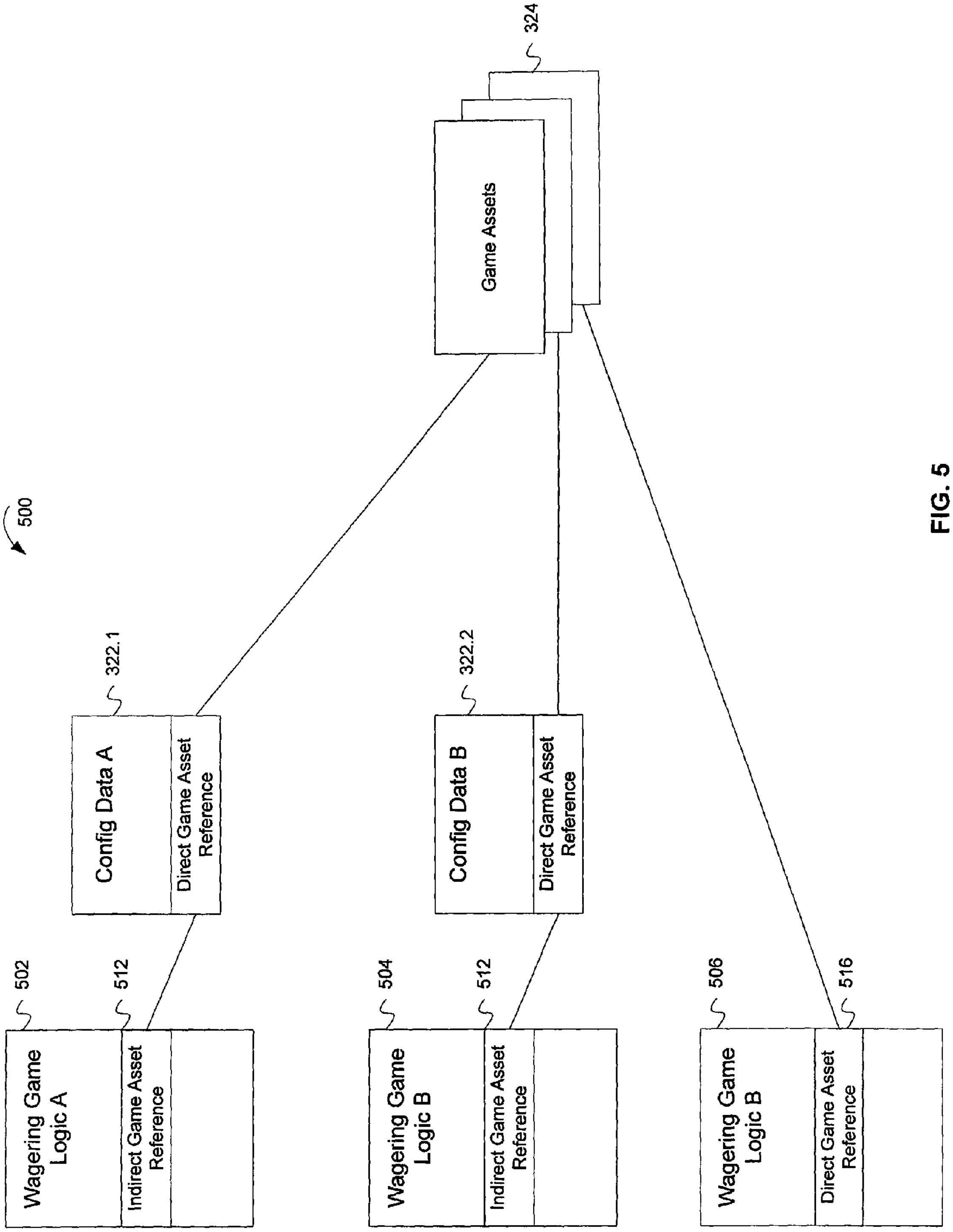
FIG. 5 is a block diagram illustrating a software architecture according to example embodiments of the invention.

FIG. 5 is a block diagram illustrating a software architecture 500 according to example embodiments of the invention. In some embodiments, architecture 500 includes wagering game logic 502, 504 and/or 506, configuration data 322.1 and/or 322.2 and game assets 324. Wagering game logic 502 comprises instructions and data for presenting a component of a wagering game. The component may be a base wagering game, a bonus round for a wagering game, an episode presented by the wagering game, or any other component of a wagering game. The instructions and data may be implemented as object code for a processor, as a script, as an intermediate representation or any other interpreted processing language. The embodiments are not limited to any particular method of logic or instruction execution.

Wagering game logic 502, 504 and/or 506 may include a game asset reference. A game asset reference comprises a reference to data comprising a game asset. The reference may be to a file, for example a file in a file system. Alternatively, the reference may be to a database entity such as one or more rows and columns in a database or a BLOB (Binary Large Object) in a database. A game asset reference may be a direct reference 516 or an indirect reference 512. A direct reference is a reference that is defined in the wagering game logic 506 and that specifically identifies the file, row(s), column(s) or other objects containing the game asset data. For example, assume that the file "battleship.dat" includes data that defines a battleship (e.g. a mesh, skeleton, texture data etc.). A call to open the file named "battleship.dat" in wagering game logic 506 is a direct reference.

An indirect reference is one in which the game asset is accessed through another reference. For example, in some embodiments, configuration data 322 may specify a mapping from an indirect reference to a direct reference. For example, assume that wagering game logic 502, 504 and 506 provide a bonus round for a wagering game that involves a board game with tokens, and that tokens may be selected by a player. For this example, further assume that there are two files, "battleship.dat" as described above and a file "racecar.dat" that includes data that defines a racing car (e.g. a mesh, skeleton, texture data etc.). Further assume configuration data 322.1 includes data that assigns an indirect reference to "token" to "battleship.dat" and configuration data 322.2 includes data that assigns an indirect reference to "token" to "racecar.dat". In the example provided, a call to display a "token" in wagering game logic 502 would thus display a battleship as a token, while the same call to display a token in wagering game logic 504 would display a racing car. Thus wagering game logic may be reused with little or no modification to display a variety of different graphical objects, where the appearance of graphical objects being displayed may be controlled by configuration data. For example, new code to display a different token need not be developed, rather a developer can reuse some or all of the code or logic for a wagering game and provide new graphical assets as needed to produce the desired graphical effect.

Configuration data 322 may exists in several forms in varying embodiments. For example, configuration data 322 may be one or more data files that specify associations between indirect references and direct references. In some embodiments, configuration data 322 may be an XML (extensible Markup Language) file. Configuration data may also comprise rows and columns in a database. Configuration data 322 may also comprise one or more environment variables that specify associations between indirect and direct references. Further, configuration data 322 may be one or more registry entries that specify associations between indirect and direct references. The inventive subject matter is not limited to any particular format for configuration data 322.

Figure 6:
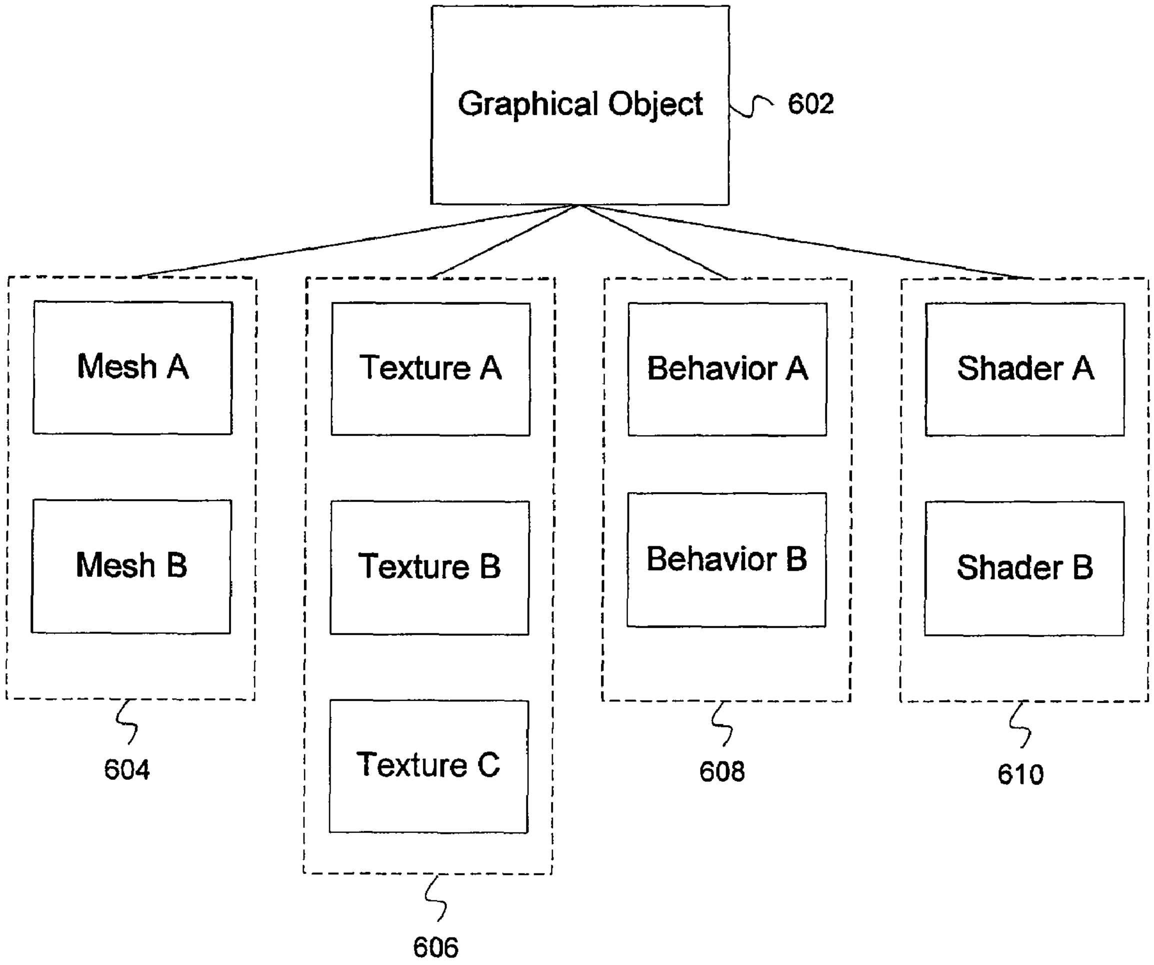
FIG. 6 is a block diagram illustrating example graphical assets for a three-dimensional object for use in embodiments of the invention.

FIG. 6 is a block diagram illustrating example graphical assets for a three-dimensional object for use in embodiments of the invention. A graphical object 602 may have different characteristics defined by mesh 604, texture 606, behavior 608 and may be rendered in differing manners by shaders 610. Continuing with the example provided above, a graphical object representing a token for a first player may be a battleship having a shape defined by mesh A, an outer skin defined by texture A, movement (e.g. floating on water) defined by behavior A, and may rendered by shader A. A second player may have a token representing a race car having a shape defined by mesh B, an outer skin defined by texture B, movement (e.g. the appearance of rapid movement) defined by behavior B, and may be rendered by shader B. A third player may also select a race car having the same characteristics as the race car described above, but with the outer skin defined by texture C. These varying combinations may be achieved using the embodiments of the invention with little or no new code, rather existing code or graphical objects may be used as a template, and the actual graphical assets used to render graphical objects may be determined by a configuration.

While a token has been used as a graphical object in the above examples, other three-dimensional graphical objects may be used as well and are within the scope of the inventive subject matter. For example, animated objects such as three-dimensional characters appearing in a wagering game, three dimensional symbols on a spinning reel, dice, coins, bingo balls etc. may displayed using the techniques described herein. Further, static three-dimensional objects such as buildings, backgrounds, scenery etc. may also be displayed using the techniques described herein.

In some embodiments, the graphical assets may be used to "brand" particular objects. The branding may be configured in response to fees paid by an advertiser or sponsor. For example, a billboard appearing in scene may use graphical assets that are configured to display a first advertisement in one casino, and a second advertisement in a second casino. Similarly, a soda bottle may use graphical assets such that the bottle is branded with a first vendors logo, trademark etc. in one casino and a second vendors logo, trademark etc. in a second casino. Further, reels, backgrounds, tables, dice etc. may use graphical assets that brand the graphical objects with the trademarks or logos of the casino property in which the wagering game is played.

Figure 7:
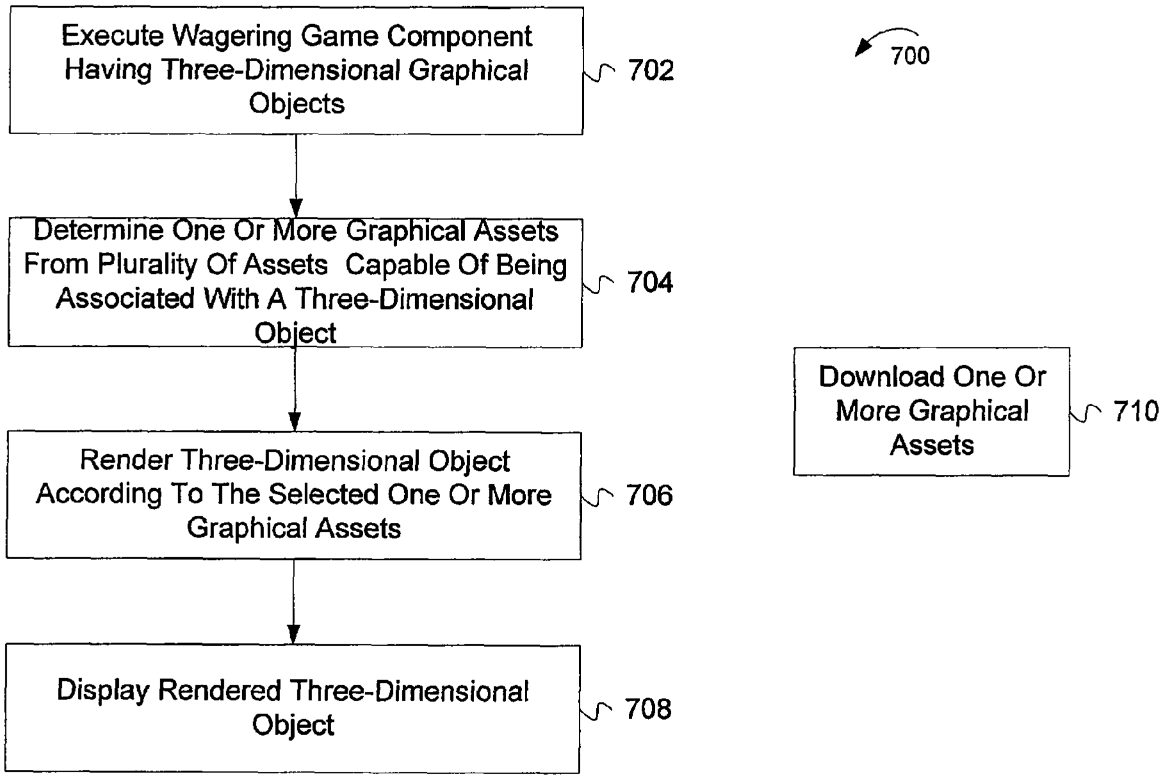
FIG. 7 is a flowchart illustrating methods for determining and using graphical assets for three-dimensional objects in wagering game machines according to example embodiments.

FIG. 7 is a flowchart illustrating methods 700 for determining and using graphical assets for rendering three-dimensional objects for a component of a wagering game presented on a wagering game machine 100 or portable wagering game machine 200. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 7 and described herein are inclusive of acts that may be taken by an operating environment executing an exemplary embodiment of the invention.

In some embodiments, the method begins at block 702 by executing a wagering game, or a component of a wagering game such as a bonus round, an episode, an advertisement presented on the wagering game machine, attract mode content displayed on the wagering game machine, or any other content displayed on the wagering game machine. The component may refer to or use one or more graphical objects representing symbols, backgrounds, characters, animations, and other types of graphical objects to be displayed on wagering game machines.

At block 704, the system determines one or more graphical assets that are to be used to render the one or more three-dimensional graphical objects. As noted above, the graphical assets may include mesh data, skeleton data, texture data, texture maps, behavior data, animation data, audio cue data, shader programs, lighting models, object parameters etc. Further, the system may determine which graphical assets to use by reading configuration data that associates the graphical assets with a graphical object.

At block 706, the three-dimensional objects are rendered according to the graphical assets determined above at block 704. The rendered three-dimensional objects are displayed on a display of the wagering game machine at block 708.

It should be noted that graphical assets may be loaded at various points in the method above, as represented by block 710. For example, in some embodiments, graphical assets and/or configurations are downloaded to a wagering game machine as the assets or configurations become available on a server. Thus the graphical assets may be made available before the next execution of a wagering game component. In alternative embodiments, graphical assets may be downloaded onto a wagering game machines as the graphical assets are referenced by the wagering game component. In further embodiments, the "container" for a graphical asset (e.g. a file, row, BLOB, etc.) remains on a server in a wagering game network, and the content of the "container" is transferred over the network when the asset is referenced.

In some embodiments, graphical assets may be loaded onto a memory storage unit such as a flash drive or hard drive and need not be downloaded from a server.

CONCLUSION

Systems and methods for using templated graphical objects and graphical assets to display three-dimensional graphical objects on a wagering game machine have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method performed by a wagering game machine, comprising:

executing a wagering game upon which monetary value may be wagered, the wagering game machine providing the wagering game on a gaming display;

determining one or more graphical assets from a plurality of graphical assets for a three-dimensional graphical object within a component of the wagering game, by:

receiving an indirect reference from logic of the wagering game for construction of the three-dimensional graphical object, the three-dimensional graphical object defined by a plurality of graphical asset characteristics associated with the indirect reference; and reading configuration data of the wagering game to translate the indirect reference to a direct reference to the one or more graphical assets, and to determine which particular graphical assets of the plurality of graphical assets are used to render the three-dimensional graphical object in the wagering game using the plurality of graphical asset characteristics;

wherein the plurality of graphical assets conforms to a plurality of graphical asset types, wherein each graphical asset provides different display characteristics for a portion of the three-dimensional graphical object and is used to define three-dimensional characteristics of the three-dimensional graphical object, and wherein each graphical asset of a graphical asset type is interchangeable for use in the three-dimensional graphical object;

rendering the three-dimensional graphical object in real time during operations of the wagering game using the one or more graphical assets; and displaying the rendered three-dimensional graphical object in the wagering game using the gaming display.

2. The method of claim 1, further comprising downloading the one or more graphical assets.

3. The method of claim 2, wherein downloading the one or more graphical assets occurs during the run-time of the wagering game.

4. The method of claim 1, wherein the one or more graphical assets include a shader program and wherein the method further comprises loading the shader program onto a graphical processing unit.

5. The method of claim 1, wherein the one or more graphical assets include graphical assets provided from mesh data, skeleton data, texture data, behavior data, or audio cue data graphical asset types.

6. The method of claim 1, wherein determining one or more graphical assets includes determining one or more graphical assets from a plurality of graphical assets provided by a server.

7. An apparatus comprising:

at least one processor and at least one memory, the processor operable to:

execute a wagering game upon which monetary value may be wagered, and determine one or more graphical assets from a plurality of graphical assets for a three-dimensional graphical object within a component of the wagering game, using operations to:

receive an indirect reference from logic of the wagering game for construction of the three-dimensional graphical object, the three-dimensional graphical object defined by a plurality of graphical asset characteristics associated with the indirect reference; and read configuration data of the wagering game to translate the indirect reference to a direct reference to the one or more graphical assets, and to determine which particular graphical assets of the plurality of graphical assets are used to render the three-dimensional graphical object in the wagering game using the plurality of graphical asset characteristics;

wherein the plurality of graphical assets conforms to a plurality of graphical asset types, wherein each graphical asset provides different display characteristics for a portion of the three-dimensional graphical object and is used to define three-dimensional characteristics of the three-dimensional graphical object, and wherein each graphical asset of a graphical asset type is interchangeable for use in the three-dimensional graphical object; and a graphical processing unit operable to:

render the three-dimensional graphical object in real time during operations of the wagering game using the one or more graphical assets, and display the rendered three-dimensional graphical object in the wagering game.

8. The apparatus of claim 7, further comprising an interface to an external system and wherein the processor is further operable to download the one or more graphical assets through the interface.

9. The apparatus of claim 7, wherein the one or more graphical assets include a shader program and wherein processor is further operable to load the shader program onto a graphical processing unit.

10. The apparatus of claim 7, wherein the one or more graphical assets include graphical assets provided from mesh data, skeleton data, texture data, behavior data, or audio cue data.

11. A system comprising:

a wagering game machine operable to present a wagering game upon which monetary value may be wagered, the wagering game including a wagering game component, wherein the wagering game machine provides the wagering game on a gaming display;

a plurality of graphical assets for three-dimensional graphical objects, wherein the plurality of graphical assets has a plurality of graphical asset types; and configuration data used to determine which of the plurality of graphical assets to render in the wagering game machine;

wherein the wagering game machine is operable to:

determine, using the configuration data, one or more graphical assets from the plurality of graphical assets for a three-dimensional graphical object within the wagering game component, using operations to:

receive an indirect reference from logic of the wagering game for construction of the three-dimensional graphical object, the three-dimensional graphical object defined by a plurality of graphical asset characteristics associated with the indirect reference; and read configuration data of the wagering game to translate the indirect reference to a direct reference to the one or more graphical assets, and to determine which particular graphical assets of the plurality of graphical assets are used to render the three-dimensional graphical object in the wagering game using the plurality of graphical asset characteristics;

wherein each graphical asset of a graphical asset type is interchangeable for use in the three-dimensional graphical object, and wherein each graphical asset provides different display characteristics for a portion of the three-dimensional graphical object and is used to define three-dimensional characteristics of the three-dimensional graphical object;

render the three-dimensional graphical object in real time during operations of the wagering game using the one or more graphical assets, and display the rendered three-dimensional graphical object in the wagering game using the gaming display.

12. The system of claim 11, further comprising a server to store the plurality of graphical assets and wherein the wagering game machine downloads one or more of the plurality of graphical assets from the server.

13. The system of claim 11, wherein the configuration data comprises a file.

14. The system of claim 13, wherein the configuration data comprises an XML file.

15. The system of claim 11, wherein the wagering game component comprises a scripted component.

16. The system of claim 11, wherein the wagering game component includes a bonus round for the wagering game.

17. The system of claim 11, wherein the one or more graphical assets include a shader program and wherein wagering game machines includes a graphical processing unit operable to execute the shader program.

18. The system of claim 11, wherein the one or more graphical assets include graphical assets provided from mesh data, skeleton data, texture data, behavior data, or audio cue data.

19. A machine-readable storage medium having machine executable instructions to cause one or more processors of a wagering game machine to perform a method, the method comprising:

executing a wagering game upon which monetary value may be wagered;

determining one or more graphical assets from a plurality of graphical assets for a three-dimensional graphical object within a component of the wagering game, by:

receiving an indirect reference from logic of the wagering game for construction of the three-dimensional graphical object, the three-dimensional graphical object defined by a plurality of graphical asset characteristics associated with the indirect reference; and read configuration data of the wagering game to translate the indirect reference to a direct reference to the one or more graphical assets, and to determine which particular graphical assets of the plurality of graphical assets are used to render the three-dimensional graphical object in the wagering game using the plurality of graphical asset characteristics;

wherein the plurality of graphical assets conforms to a plurality of graphical asset types, wherein each graphical asset provides different display characteristics for a portion of the three-dimensional graphical object and is used to define three-dimensional characteristics of the three-dimensional graphical object, and wherein each graphical asset of a graphical asset type is interchangeable for use in the three-dimensional graphical object;

rendering the three-dimensional graphical object in real time during operations of the wagering game using the one or more graphical assets; and displaying the rendered three-dimensional graphical object in the wagering game.

* * * * *

UNITED STATES PATENT AND TRADEMARK OFFICE

CERTIFICATE OF CORRECTION

PATENT NO. : 8,357,040 B2
APPLICATION NO. : 12/183605
DATED : January 22, 2013
INVENTOR(S) : Ansari et al.

It is certified that error appears in the above-identified patent and that said Letters Patent is hereby corrected as shown below:

In the Specifications

In column 2, line 66, after "poker,", delete "blackjack", therefor

In column 3, line 57, after "may", delete "be", therefor

In column 4, line 18, after "poker,", delete "blackjack", therefor

In column 5, line 13, delete "210" and insert --200--, therefor

In column 5, line 39, delete "210" and insert --200--, therefor

In column 6, line 42, delete "can", insert --can be--, therefor

In column 15, line 5, delete "extensible" and insert --eXtensible--, therefor

In column 15, line 41, delete "may", insert --may be--, therefor

Signed and Sealed this
Fourth Day of June, 2013

Teresa Stanek Rea
*Acting Director of the United States Patent and Trademark Office*